Figure 1:
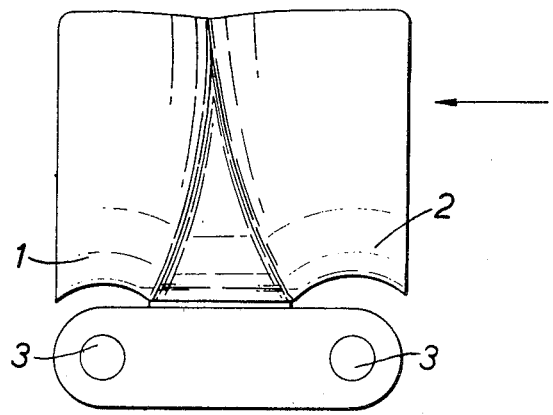

Inventor:
RICHARD TROUGHTON CARRADUS
by
Attorney

May 3, 1966 R. T. CARRADUS 3,249,208
CONVEYORS
Filed June 23, 1964 2 Sheets-Sheet 2

Inventor:
RICHARD TROUGHTON CARRADUS
by Att'y

3,249,208
CONVEYORS
Richard T. Carradus, St. Albans, England, assignor to
J. H. Schmitz-Sohne G.m.b.H., Homburg, Niederheim,
Germany, a corporation of Germany
Filed June 23, 1964, Ser. No. 377,233
Claims priority, application Great Britain, June 24, 1963,
24,963/63
2 Claims. (Cl. 198—196)

This invention relates to conveyors of the kind formed of overlapping troughed plates and which are suitable for the transport in bulk of coal, grain or other like material. The troughed plates are mounted centrally on an endless chain of links provided with articulations to enable flexing of the chain vertically, and also sometimes horizontally. Some or all of the troughed plates may be formed with lateral supporting and guiding rollers which run on guide rails or tracks extending along each side of the conveyor.

In a conveyor of this kind as known heretofore a pan is of part circular outline in cross section and all parts of the pan have the same section in longitudinal planes normal to their surfaces. At its rear the pan is circular in section, the radius thereof being struck from the chain pin below the pan on the longitudinal centre line. The rear part of the pan is therefore of toroidal form. The forward part of the pan is straight in longitudinal section.

The forward straight part of each pan overlaps the toroidal rear part of the pan in front, always being in contact therewith on the longitudinal centre line. When two succeeding pans hinge relatively to each other about the chain pin below they remain in contact on the centre line, but increasingly away from the centre line gaps open out between them. This is not a very serious disadvantage in many cases; indeed, where some articulation in a horizontal plane by means of hinges in some of the chain links is desired, it is necessary. It can and does result, however, in some escape of material, especially fine material, between the pans.

The present invention has for its object to provide an improved form of pan which will ensure the snug fitting of succeeding pans at all times. It is realised, of course, that as a result articulation in a horizontal plane will be obviated, but for many purposes this disadvantage is outweighed by the advantage of having snugly fitting pans between which material cannot escape.

According to this invention there is provided a pan for a conveyor of the kind referred to in which the rear part thereof, which in the assembled conveyor, is disposed in overlapping relationship with the forward part of the succeeding pan is so curved that on the articulation of the two pans in relationship to each other in a vertical plane the overlapping parts thereof remain in snugly fitting contact substantially throughout. The curvature of said rear part is not constant across the width of the pan but in vertical longitudinal section comprises parts of circles whose centres will lie on the horizontal centre line of the hinge pin below it in an assembled conveyor.

The forward part of the pan may also be curved or it may be straight.

Figure 2:
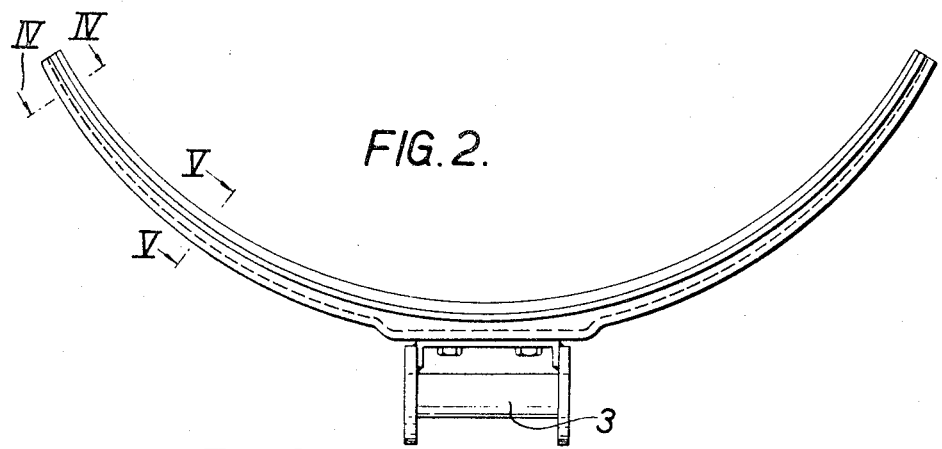
Figure 3:
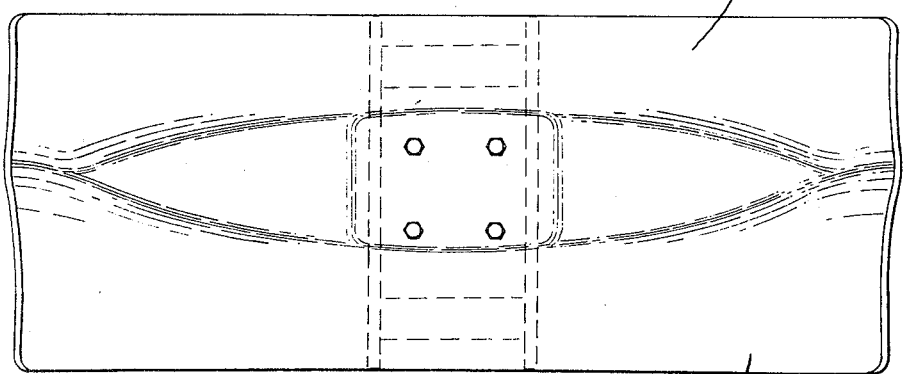
Figure 4:
Figure 5:
Figure 6:
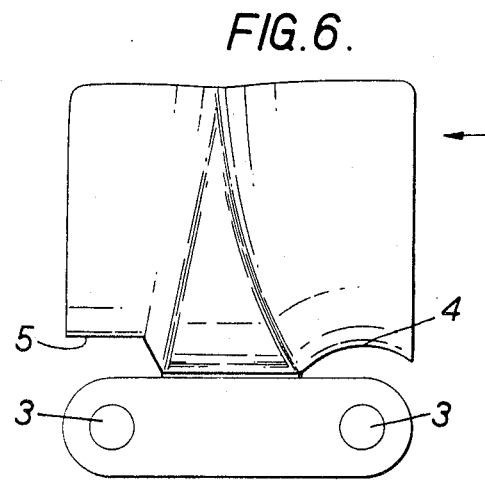
Figure 7:
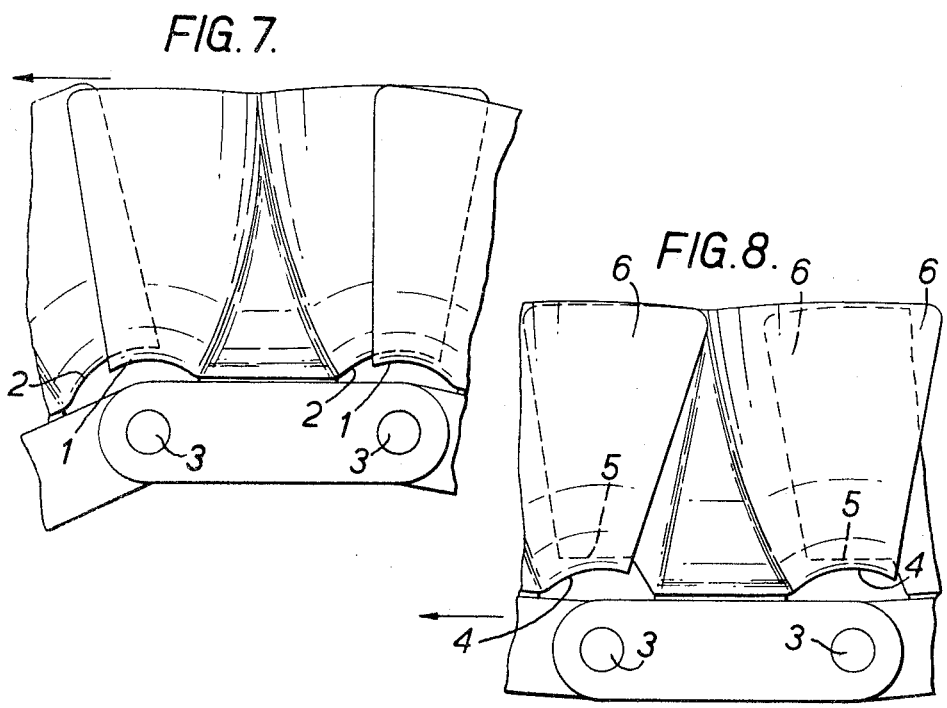
Figure 8:
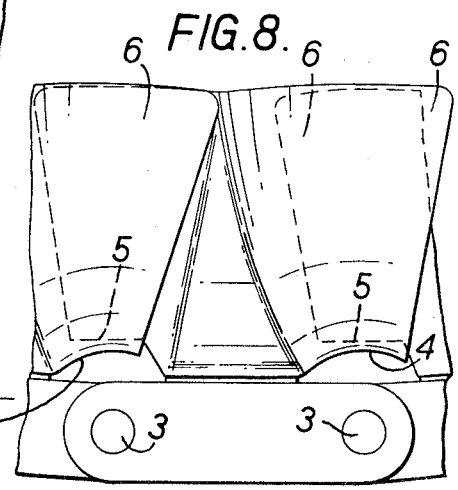

In the accompanying drawings:

FIGURE 1 shows in side elevation a conveyor pan in accordance with this invention, FIGURE 2 is a front elevation thereof, and FIGURE 3 is a plan view thereof;

FIGURES 4 and 5 are sections on the lines IV—IV and V—V respectively in FIGURE 2, FIGURE 6 shows in side elevation a modified conveyor pan in accordance with this invention, FIGURE 7 shows in side elevation a fragment of a conveyor formed of pans substantially as shown in FIGURES 1 to 3, but incorporating a further modification, and FIGURE 8 shows in side elevation a fragment of a conveyor formed of pans substantially as shown in FIGURE 6 but also incorporating the same further modification.

In the pan as shown in FIGURES 1 to 3 the forward and rear portions 1 and 2 thereof are both arched in longitudinal section about the axis of the hinge pin 3. The curvature of each portion 1, 2 increases from the central longitudinal section of the pan toward the edges of the pan as indicated in FIGS. 1, 6, 7, 8 in dotted lines and in FIGS. 4 and 5 in cross section.

As shown in FIGURE 7, in an assembled conveyor the rear part 2 of one pan overlaps the forward part 1 of the pan behind. When two succeeding pans articulate in relationship to each other the overlapping parts thereof remain in contact substantially throughout, and escape of material, especially fine material, between them is not possible.

In the pan as shown in FIGURE 6 the rearward part 4 only of the pan is curved as above described. The forward part 5 thereof is straight. The arrangement is such that in an assembled conveyor (see FIGURE 8) the straight forward part of each pan overlaps the curved rear part of the pan in front of it, being in tangential contact therewith in a radial plane which passes through the centre line of the chain hinge pin 3 below. This may have a slight disadvantage in that there is a gap between the overlapping parts of the pans in front of the line of contact thereof, in which small objects might jam. To obviate this possibility the straight forward parts of pans may end at their line of contact with the curved rear parts of the pans in front. The pans will still remain in contact on articulation, and the edges of the straight forward parts may effect an advantageous scraping action.

In a modification, which is also shown in FIGURES 7 and 8 the longitudinal dimensions of each pan increase from their center towards their lateral edges. This is desirable where pans are to be articulated sharply towards each other, in which case there is a tendency for the forward part of a pan to foul the bottom of the pan in front, and for the rear part thereof to foul the chain link below it. Moreover, it will be appreciated that there is less relative movement between pans near the centre line than at the lateral edges thereof. The increased overlap provided by the longer lateral parts 6 serves to prevent the formation of gaps between pans as they articulate away from each other when a conveyor as a whole is curved in a vertical plane about centres below it and when it goes around sprockets at the end of the conveyor.

When the cross section of pans is a full semi-circle the lateral extremities of the pans will be uncurved in longitudinal section.

In the several figures of the drawings the normal direction of movement of the pans is indicated by arrows.

I claim:
1. A continuous trough conveyor comprising in combination a transmission chain composed of chain elements and hinge pins connecting the same; a plurality of pans, each attached to one chain element and having an open top bottom substantially cylindrically curved about an axis extending in the longitudinal direction of the chain; at least the trailing rear portion of each pan located above one hinge pin being transversely arched about the axis of said hinge pin and each such trailing rear portion overlapping the leading forward portion of the next following pan located above the same hinge pin to ensure an articulated contact of neighboring pans.

2. A continuous trough conveyor according to claim 1 wherein the longitudinal dimension of each pan increases from its bottom towards the edge portions at its open top.

References Cited by the Examiner
UNITED STATES PATENTS 2,936,063  5/1960  Hemsley _____ 198—196

FOREIGN PATENTS 527,052  3/1954  Belgium.

EVON C. BLUNK, *Primary Examiner.*

RICHARD E. AEGERTER, *Examiner.*